3,483,215
AZETIDINO[3,2-d]THIAZOLIDINES AND PROCESS
FOR THEIR MANUFACTURE
Robert Burns Woodward, 12 Oxford St.,
Cambridge, Mass. 02138
No Drawing. Filed Aug. 22, 1966, Ser. No. 573,815
Claims priority, application Switzerland, Sept. 10, 1965,
12,623/65; Dec. 9, 1965, 16,975/65; Jan. 13, 1966,
448/66
Int. Cl. C07d 91/16
U.S. Cl. 260—306.7                                    7 Claims

ABSTRACT OF THE DISCLOSURE 4,4 - disubstituted 3-acyl-2-oxo-azetidino[3,2-d]thiazolidine compounds and their manufacture by treating (1) a 2,2 - disubstituted 3-acyl-5α-amino-thiazolidine-4-carboxylic acid or (2) an ester thereof with (1) a dehydrating agent or (2) an organic metal compound. The products are useful for the preparation of 7-aminocephalosporanic acids.

The present invention relates to a methodological process for the manufacture of azetidine compounds, which process is used in the manufacture of valuable intermediate products and which, in particular, was used in the first synthesis of 7-amino-cephalosporanic acid and the derivatives thereof, the process being specially suitable for this synthesis.

7-amino-cephalosporanic acid has the following Formula XVI

The derivatives are mainly N-acyl compounds in which the acyl radicals are especially those of active N-acyl derivatives of 7-amino-cephalosporanic acid, for example, thienylacetyl, such as 2-thienylacetyl-, cyanoacetyl, chloroethylcarbamyl or phenylacetyl radicals or easily eliminable acyl radicals such as the radical of a semi-ester of carbonic acid, for example, the tertiary-butyloxycarbonyl radical.

The synthesis of this important compound, which is of great value in the preparation of medicaments, and the derivatives thereof is based on the principle of using a 3,5-unsubstituted 2,2-disubstituted thiazolidine-4-carboxylic acid as starting material, for example, a compound of the Formula I and carrying out the novel synthesis, for example, to the following scheme of formulae:

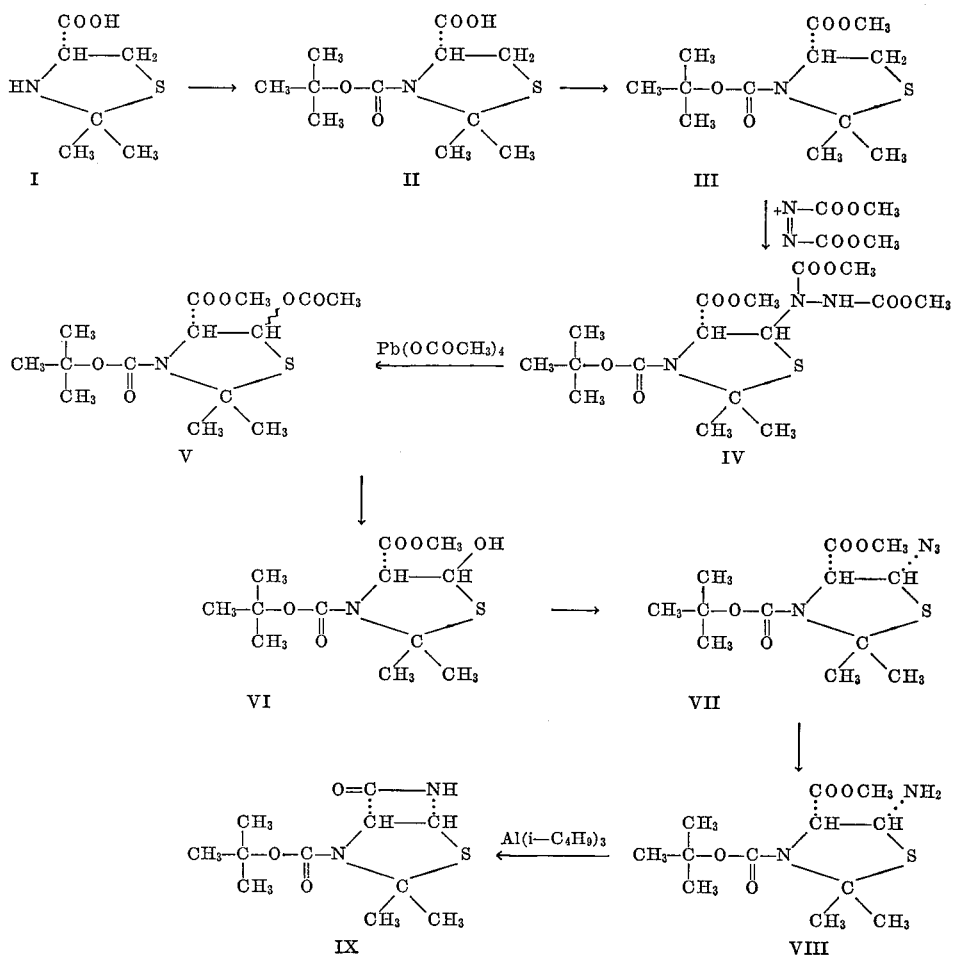

The compound IX is converted into the desired 7-amino-cephalosporanic acid and its derivatives as follows:

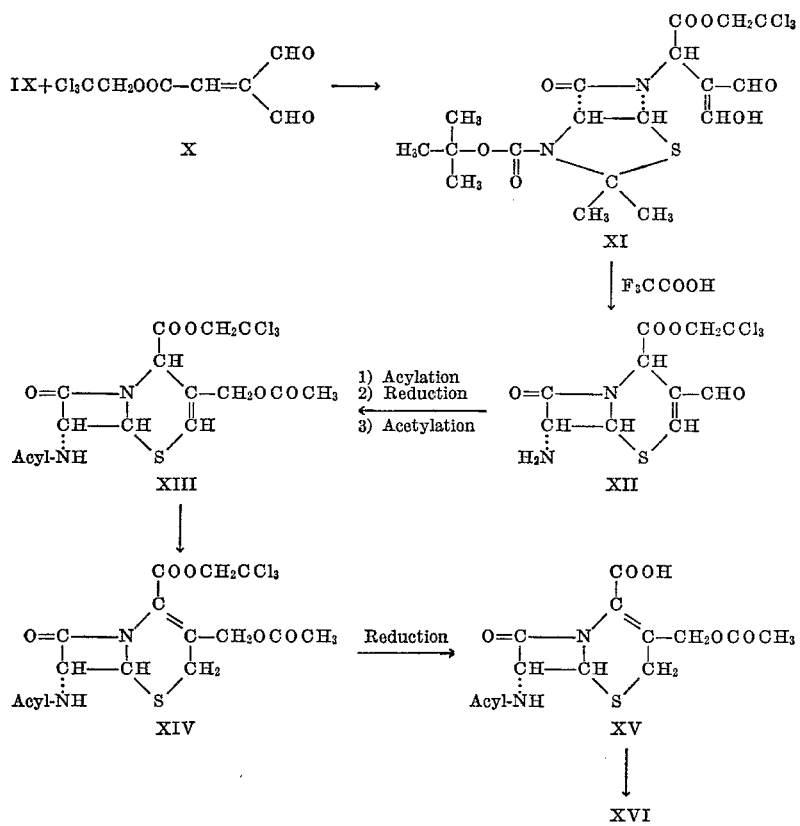

The compound of the Formula X which is used as intermediate product is prepared as follows:

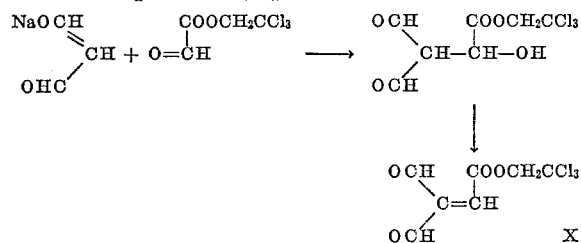

The above-mentioned azetidine compounds, which are valuable intermediate products, for example, the compounds of the Formula IX, are, surprisingly, obtained by treating a 2,2-disubstituted 3-acyl-5α-amino-thiazolidine-4-carboxylic acid or an ester thereof, for example, a compound of the Formula VIII, with an agent suitable for β-lactam-formation, and, if desired, splitting off a substituent in resulting compound or converting it into another substituent.

The above reaction is carried out by different methods depending on whether a free or esterified β-aminocarboxylic acid is used as starting material. For example, the desired azetidino[3,2-d]thiazolidin-2-one compounds are obtainable by treating the free β-aminocarboxylic acid, for example, with dehydrating agents, such as carbodiimides, for example, dicyclohexylcarbodiimide.

Esters of the β-aminocarboxylic acids with alcohols, especially aliphatic or araliphatic esters, for example, lower alkyl or substituted, for example, halogen-containing lower alkyl or phenyl-lower alkyl esters as well as aromatic esters, such as phenyl esters, used as starting materials are treated with organic metal compounds, for example, organic magnesium halides, especially hindered organic magnesium halides, for example, chlorides or bromides, such as tertiary butyl-magnesium halides or mesityl-magnesium halides such as chlorides or bromides, to yield the desired azetidino[3,2-d]thiazolidin-2-on compounds. Organic aluminum compounds have been found to be especially suitable. These are primarily aluminum compounds containing 1 to 3 organic radicals having aliphatic or cycloaliphatic, aromatic or araliphatic characteristics, especially lower alkyl radicals, for example, methyl, ethyl, n-propyl, isopropyl, n-butyl, isobutyl, sec. butyl, n-pentyl or n-hexyl radicals, as well as cycloalkyl radicals, for example, cyclohexyl radicals, or aliphatic or cycloaliphatic etherfied hydroxyl groups, for example, lower alkoxy radicals, such as isopropyloxy, n-butyloxy or isobutyloxy radicals. Aluminum compounds of this kind are, for example, tri-lower alkyl aluminum, such as trimethylaluminum or triisobutylaluminum, di lower alkyl aluminum hydrides or halides, such as diisobutyl-aluminum hydride, dimethylaluminum chloride, diethylaluminum hydride, di-isobutylaluminum chloride or diethyl-aluminum chloride, or tricycloalkyl aluminum, such as tricyclohexyl-aluminum, or dicycloalkyl aluminum hydrides or halides, such as dicyclohexyl-aluminum chloride (the aluminum halide compounds being preferably used in the presence of a base), as well as tri-lower alkoxy aluminum, such as aluminium-isopropylate.

Formation of the lactam in accordance with the process of the invention is preferably carried out in the presence of a diluent, with cooling, at room temperature or at an elevated temperature, if necessary, in an inert gas atmosphere and/or in a closed vessel. Solvents which are especially suitable for use in the presence of the preferred organic aluminum compounds are aliphatic or aromatic hydrocarbons, for example, pentane, hexane, benzene, toluene or xylene, or suitable ether or thioether compounds, for example, tetrahydrofuran, ethyleneglycol dimethyl ether, diethylene glycol dimethylether, dioxane or tetrahydrothiophene.

Substituents in the compounds obtained can be split off by known methods and/or converted into other substituents. For example, tertiary-butyl-esters can be split off under acidic conditions, and a free amino group in the compounds obtained can be substituted, for example, by a treatment with suitable acylating agents.

The compounds obtained by the process of the invention are 4,4-disubstituted 3-$R_1$-2-oxo-azetidino[3,2-d]thiazolidine compounds, especially compounds of the Formula IXa

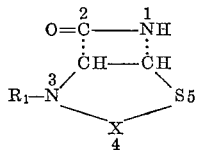

in which $R_1$ represents a hydrogen atom or preferably an acyl group and X stands for the disubstituted carbon atom of the thiazolidine ring.

Acyl radicals are primarily those that are present in pharmacologically active N-acyl derivatives of 7-aminocephalosporanic acid, for example, thienylacetyl, such as 2-thienylacetyl, chloroethylcarbamyl or phenylacetyl radicals, or easily eliminable acyl radicals, for example, the radical of a semi-ester of carbonic, such as a tertiary-butyl-oxycarbonyl radical.

The radical —X— represents, in particular, a group of the formula

in which $R_2$ and $R_3$ represent hydrocarbon radicals, especially aliphatic hydrocarbon hadicals, for example, lower alkyl groups, such as ethyl, n-propyl, isopropyl or preferably methyl groups, as well as aromatic groups, especially phenyl groups, or araliphatic hydrocarbon radicals, especially phenylalkyl groups, such as benzyl or phenylethyl groups, as well as functionally converted, particularly esterified carboxyl groups, such as carbo-lower alkoxy, for example, carbomethoxy or carbethoxy groups, or together, represent a divalent hydrocarbon radical, especially a divalent aliphatic hydrocarbon radical, for example, a lower alkylene group, such as a 1,4-butylene or 1,5-pentylene group, a phthaloyl group or an oxo group or a thiono group. The above mentioned hydrocarbon radicals are unsubstituted or may be substituted, for example, by lower alkyl groups, such as methyl or ethyl groups, lower alkoxy groups, such as methoxy or ethoxy groups, halogen atoms, such as fluorine, chlorine or bromine atoms, halogenated alkyl groups, such as trifluoromethyl groups or other suitable groups.

The invention further includes any modification of the present process in which an intermediate product obtainable at any stage of the process is used as starting material and any remaining steps are carried out, or the process is discontinued at any stage thereof; furthermore, the starting materials may be used in the form of derivatives, for example, salts, or they may be formed during the reaction.

Preferably, the starting materials and the reaction conditions are chosen in a manner such that the compounds indicated above as being the preferred compounds are obtained.

The starting materials used in the above process can be obtained by the process described in application Ser. No. 573,865, filed Aug. 22, 1966.

These are particularly esters of the 2,2-disubstituted 3-acyl-5α-amino-thiazolidine-4-carboxylic acids used as the starting materials, such as the lower alkyl, for example, methyl, ethyl, n-propyl, isopropyl esters, or substituted lower alkyl esters, such as phenyl-lower alkyl e.g. benzyl or diphenylmethyl esters, or halogeno-lower alkyl, e.g. 2,2,2-trichloroethyl esters, as well as phenyl esters, such as phenyl or nitrophenyl esters.

As is shown in the reaction scheme, the compounds obtainable by the process of the invention can be converted into 7-amino-cephalosporanic acid and the derivatives thereof; conversion can be effected, for example, by the processes described in application Ser. No. 573,886, filed Aug. 22, 1966, application Ser. No. 573,886, filed Aug. 22, 1966, and application Ser. No. 573,876, filed Aug. 22, 1966.

The present invention also includes a process for the preparation of any 2-azetidinone compound by treating β-aminocarboxylic acid esters, such as lower alkyl esters, with organic aluminium compounds, especially with the above-mentioned organic aluminium compounds. This process is used primarily for β-aminocarboxylic acid esters which contain a hetero atom, for example, an oxygen atom or a sulphur atom, at a position in the molecule which does not form part of the 2-azetidinone ring, for example, in one of the positions vicinal to the α- and/or β-carbon atoms of the β-aminocarboxylic acid ester. These are, in particular, β-aminocarboxylic acid esters, for example, lower alkyl, for example, methyl or ethyl esters, phenyl-lower alkyl esters or substituted, for example halogenated lower alkyl esters of acids which contain an esterified hydroxyl or mercapto group in a position vicinal to the β-carbon atom in the remaining part of the molecule; starting materials of this kind are, for example, saturated cyclic β-esterified carboxy-α-amino-thioethers, for example 2,2-disubstituted cis-3-acyl-5-amino-thiazolidine-4-carboxylic acid ester, for example, aliphatic, such as lower alkyl esters, or substituted lower alkyl esters, or araliphatic esters, such as phenyl-lower alkyl esters, especially compounds of the formula

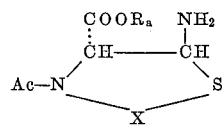

in which X has the meaning given above, Ac is an acyl group, such as one of those representing $R_1$, and $R_a$ represents the radical of an alcohol, for example, an aliphatic or araliphatic alcohol, especially a lower alkanol or a substituted lower alkanol, for example, a phenyl-lower alkanol or a halogeno-lower alkanol.

The following examples illustrate the invention.

EXAMPLE 1

A mixture of 3.832 g. of L-2,2-dimethyl-3-tertiary butyl-oxy-carbonyl - 5α - amino - thiazolidine - 4 - carboxylic acid methyl ester in 160 ml. of absolute toluene is cooled with ice and 29 ml. of a 0.96-m. solution of triisobutyl aluminium in toluene are slowly added in a nitrogen atmosphere while stirring. After stirring for 64 hous at 7° C., the mixture is stirred for 2 hours with ice while cooling with an ice bath and is then filtered through a filter aid. The latter is washed well with toluene and chloroform. The filtrate is dried over anhydrous sodium sulphate and evaporated under reduced pressure, the residue is dissolved in 75 ml. of cyclohexane and 10 ml. of hexane; while cooling at −18° C. a crystalline precipitate forms which is isolated by filtration, washed with hexane and recrystallized from cyclohexane. The small amount of product so obtained is the N-(β-amino-α-formylethenyl)-carbamic acid tertiary butylester of the formula

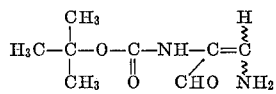

which melts at 145.5 to 147° C. after further crystallization from benzene.

The filtrate is evaporated and chromatographed on 320 g. of silica gel in a 142.5:7.5 mixture of benzene and ethyl acetate, 150 ml. fractions being taken. With the use of 127:23 to 125:25 mixtures of benzene and ethyl acetate (450 ml.) one of the isomers of 2,2-dimethyl-3-tertiary butyloxycarbonyl - 4 - aminomethylene - thiazolidin-5-one of the formula

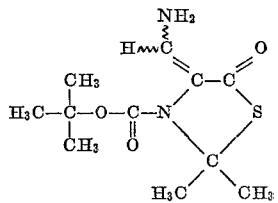

melting at 105° C. is obtained, with 300 ml. of 124:26 to 123:27 mixtures of benzene and ethyl acetate a mixture of the two isomers is eluted, and with 300 ml. of 122:28 to 121:29 mixtures of the same solvents the other isomer is obtained; the latter melts at 109.5–110° C. after recrystallization from hexane; in another modification the product melts at 89.5 to 90° C.

The main product obtained by eluting with 750 ml. of 120:30 to 116:34 mixtures of benzene and ethyl acetate is 3-tertiary butyloxy-carbonyl - 4,4 - dimethyl-azetidino [3,2-d]thiazolidin-2-one of the formula

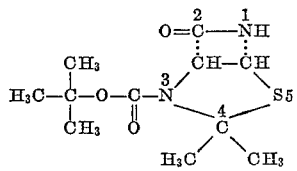

After recrystallization from hexane the product melts at 120.5° C.;$[\alpha]_D = -274°$ (C=0.522 in chloroform); infra-red absorption bands (in methylene chloride) at 2.95μ, 5.62μ, 5.90μ, 7.25μ, 7.35μ, 7.75μ, 8.65μ, 9.36μ, 10.60μ, 11.65μ and 12.30μ; it retains the configuration of L-2,2-dimethyl-3-tertiary-butyloxycarbonyl - 5α - amino - thiazolidine-4-carboxylic acid ester.

Unreacted starting material is eluted from the chromatogram with 115:35 to 100:50 mixtures of benzene and ethyl acetate (600 ml.); a further amount of the desired lactam compound can be obtained by chromatographing on silica gel the crystallization mother liquors and subsidiary fractions.

EXAMPLE 2

A mixture of 0.059 g. of L-2,2-dimethyl-3-tertiary butyloxycarbonyl-5α-amino-thiazolidine-4-carboxylic acid methyl ester in 2 ml. of absolute toluene, is treated with 0.4 ml. of a 20% solution of di-isobutyl-aluminum hydride in toluene which is added at room temperature and in a nitrogen atmosphere; the reaction mixture warms to about 35° C. and turns yellow. After 20 minutes the reaction mixture is treated with ice and shaken, then diluted with cyclohexane; the residual aluminium is removed by centrifuging and stirred twice with cyclohexane and centrifuged each time. The organic solutions are decanted, dried over sodium sulphate and evaporated. The residue is chromatographed on 8 g. of silica gel; elution with three 25 ml. fractions of a 22:3 mixture of benzene and ethyl acetate yields a product which is again chromatographed on 5 g. of silica gel; elution with a 23.25: 1.75 mixture of benzene and ethyl acetate yields the desired 3-tertiary butyloxycarbonyl-4,4 - dimethyl-azetidino[3,2-d]thiazolidin-2-one, which shows a strong band at 5.64μ in the infra-red spectrum.

EXAMPLE 3

A mixture of 0.145 g. of L-2,2-dimethyl-3-tertiary butyloxycarbonyl-5α-amino-thiazolidine-4-carboxylic acid methyle ester in 4 ml. of absolute toluene and 2 ml. of a 0.975-m. solution of aluminium-isopropylate in absolute toluene (prepared from freshly distilled aluminium-isopropylate) is heated for 15 minutes at 100° C. After heating for an additional 15 minutes at 115° C., a strong β-lactam band appears at 5.63μ and a weak ester band at 5.73μ. The desired 3-tertiary butyloxycarbonyl - 4,4-dimethyl-azetidino[3,2-d]thiazolidin-2-one can be obtained in the manner described in the preceding examples.

EXAMPLE 4

A mixture of 1.162 g. of L-2,2-dimethyl-3-tertiary butyloxycarbonyl-5α-amino-thiazolidine-4-carboxylic acid methyl ester and 1.4 ml. of ethyl-diisopropylamine in 75 ml. of absolute toluene is cooled in an ice bath while stirring. The mixture is gassed with nitrogen and then 5.76 ml. of a toluene solution containing 8 mmols of diethyl-aluminium chloride are added. After stirring for 32 hours at 7° C., the reaction mixture is diluted with chloroform, stirred for 10 minutes with ice and a saturated solution of sodium hydrogen carbonate, and then filtered. The aqueous phase is extracted several times with chloroform. The combined organic extracts are filtered through a filter aid, the latter is washed with chloroform and the combined organic solutions are dried over sodium sulphate and evaporated. The residue is chromatographed on 115 g. of silica gel; the column being prepared with a 95:5 mixture of benzene and ethyl acetate and 100 ml. fractions being taken. A small amount of an isomer of 2,2-dimethyl-3-tertiary butyloxycarbonyl - 4 - aminomethylene-thiazolidin-5-one melting at 105° C.; infra-red absorption bands (in methylene chloride) at 2.85μ, 3.02μ, 5.97μ, 6.05μ, 6.22μ, 6.60μ, 7.23μ, 7.46μ, 8.63μ, 9.25μ and 9.92μ, is eluted with 200 ml. of 87.5:12.5 to 87:13 mixtures of benzene and ethyl acetate; a mixture of the two isomers is eluted with 200 ml. of 86.5:13.5 to 86:14 mixtures (200 ml.), and the other isomer is eluted with 200 ml. of 85.5:14.5 to 85:15 mixtures; M.P. 109 to 110° C. after recrystallization from hexane; infra-red absorption bands (in methylene chloride) at 2.88μ, 3.00μ, 5.98μ, 6.15μ, 7.23μ, 7.48μ, 8.65μ, 9.23μ, 9.90μ and 11.51μ, the latter containing the 3-tertiary butyloxycarbonyl-4,4-dimethyl-azetidino[3,2-d]thiazolidin-2 - one as impurity. The main amount of the desired product is obtained by elution with 400 ml. of 84.5:15.5 to 83:17 mixtures of benzene and ethyl acetate; after recrystallization from hexane, the 3-tertiary butyloxycarbonyl - 4,4 - dimethyl-azetidino[3,2-d]thiazolidin-2-one melts at 120 to 121° C. The mother liquor, together with the product eluted with 200 ml. of 82.5:17.5 to 82:18 mixtures, is allowed to stand in hexane at —18° C. and a further amount of the desired product can be isolated.

EXAMPLE 5

A solution of 0.132 g. of L-2,2-dimethyl-3-tertiary butyloxycarbonyl-5α-amino-thiazolidine-4-carboxylic acid methyl ester in 0.5 ml. of ether is treated dropwise with 0.4 ml. of a 1.35-n solution of mesityl-magnesium bromide, in ether while cooling at —70° and working in a nitrogen atmosphere. The refrigerating bath is removed after 5 minutes, the mixture is stirred for 20 minutes and is then poured on the 2 ml. of a 10% aqueous ammonium chloride solution. The mixture is extracted with methylene chloride, the organic extract is dried and evaporated with methylene chloride, the organic extract is dried and evaporated, and the viscous residue is chromatographed on 10 g. of purified silica gel, prepared with a 9:1 mixture of benzene and ethyl acetate and 5 ml. fractions being taken isolated. According to the thin-layer chromatogram and the infra-red absorption spectrum (in methylene chloride; characteristic band at 5.60μ), fractions 8 and 9 contain the desired 3-tertiary butyloxycarbonyl-4,4-dimethyl-azetidino[3,2-d]thiazolidin - 2-one, which can be isolated according to the methods described in the preceding examples.

EXAMPLE 6

A solution of 1.351 g. of β-amino-propionic acid methyl ester (obtained from the hydrochloride by a treatment with ice-cold 10 N sodium hydroxide solution and methylene chloride) in 50 ml. of absolute ether is cooled in an ice bath and treated with 28.2 ml. of a 0.917-m. solution of tri-isobutyl-aluminium in ether while maintaining a nitrogen atmosphere and stirring. After heating for 15 hours under reflux at 45 to 50° C. the ether is evaporated; the viscous oil is dissolved in 50 ml. of ether, the solution is stirred with ice and a saturated solution of sodium hydrogen carbonate, and then filtered through a filter aid; the latter is thoroughly washed with methylene chloride each time, the combined organic solutions are dried over sodium sulphate and evaporated. The residue is sublimed at 95° C./C. 1 mm. Hg; the resulting 2-azetidinone melts at 73 to 74° C.

EXAMPLE 7

A mixture of 1.295 g. of β-amino-β-phenyl-propionic acid-methyl ester hydrochloride is shaken with 2 N sodium hydroxide solution, ice and methylene chloride; the organic solution is dried with magnesium sulphate and evaporated. The resulting β-amino-β-phenyl-propionic acid methyl ester (0.304 gram) is dissolved in 50 ml. of absolute toluene and then treated with 3.4 mmols of tri-isobutyl-aluminum in toluene at 0° C. in a nitrogen atmosphere. After stirring for 24 hours at 7° C. and for 7½ hours at 25° C., the reaction mixture is extracted with ice and methylene chloride, filtered through a filter aid, and the organic solution is dried and evaporated. The resulting crude product is chromatographed in benzene and silica gel; the crystalline 4-phenyl-2-azetidinone is eluted with 39:11 to 36:14 mixtures of benzene and ethyl acetate; it melts at 105 to 105.5° C. after recrystallization from hexane.

EXAMPLE 8

A 1.17-m. solution of tri-isobutyl-aluminium in benzene (10 ml.) is added at 20° C. in a nitrogen atmosphere to a solution of 0.588 g. of β-aminobutyric acid methyl ester (obtained from D,L-β-aminobutyric acid by treatment with methanol and gaseous hydrochloric acid via the methyl ester hydrochloride, which is converted into the free compound with 10 N sodium hydroxide solution and extraction with methylene chloride) in 25 ml. of absolute benzene. After heating for 14 hours in a nitrogen atmosphere at a bath temperature of 40° C., the reaction mixture is cooled in ice, stirred with 5 ml. of a saturated sodium hydrogen carbonate solution, and then treated with ice and methylene chloride. The mixture is filtered through a filter aid, the latter is washed with methylene chloride and the aqueous phase of the filtrate is extracted five times with 30 ml. of methylene chloride each time. The combined organic extracts are dried over sodium sulphate and evaporated; the residue is distilled and the oily 4-methyl-2-azetidinone is isolated at 90° to 100° C./0.5 to 1 mm. Hg.

EXAMPLE 9

A mixture of 0.005 g. of 4,4-dimethyl-3-tertiary butyloxycarbonyl-azetidino [3,2-d]thiazolidin-2-one and 1 ml. of trifluoroacetic acid is allowed to stand for 2 hours at room temperature. The solvent is evaporated in a water-jet vacuum and the residue is dissolved in methylene chloride; the organic solution is washed neutral with a sodium hydrogen carbonate solution and evaporated. One thus obtains the 4,4-dimethyl-azetidino[3,2-d]thiazolidine-2-one of the formula

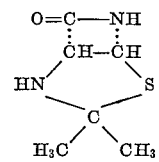

the infra-red spectrum (in methylene chloride) of which shows characteristic bands at 2.92μ and 5.66μ.

EXAMPLE 10

A mixture of 0.103 g. 3-tertiary butyloxycarbonyl-4,4-dimethyl-azetidino[3,2-d]thiazolidin-2-one and 7.5 ml. trifluoroacetic acid is allowed to stand at room temperature for 20 minutes and is then evaporated under water-pump vacuum. After neutralizing with an aqueous sodium hydrogen carbonate solution, the reaction mixture is extracted with methylene chloride, the organic extract is washed with water, dried and evaporated and the crystalline 4,4-dimethyl-azetidino[3,2-d]thiazolidin-2-one is obtained, which melts at 114–117° C. Contrary to the starting material one obtains a positive reaction with sodium nitroferricyanide (sodiumnitroprusside), which means that the product exists, at least partially, in the form of the 3-isopropylidene amino-4-mercapto-azetidin-2-one of the formula

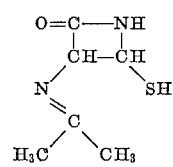

In the infrared absorption spectrum (in methylene chloride) peaks at 2.93μ, 5.67μ, 9.20μ and 10.58μ are observed.

EXAMPLE 11

A suspension of 1.652 g. of β-amino-β-phenyl-propionic acid in 50 ml. dry toluene is treated at −18° with 1.72 ml. of a benzene solution containing 20 mmoles of tri-isobutyl-aluminium under a nitrogen atmosphere. After stirring during 16 hours at 25° C., another 9 ml. of a benzene solution containing 10.5 millimoles of tri-isobutyl aluminium is added at 25°, whereupon the insoluble material goes into solution, which turns yellow. After stirring for 6 hours, the reaction mixture is heated during 17 hours under a nitrogen atmosphere and is then treated with ice and chloroform; the organic phase is filtered through a filter aid, treated over sodium sulphate and evaporated. The residue is chromatographed using 100 g. of silica gel; the column is prepared in a 91.5:0.5-mixture of benzene and ethyl acetate and 100 ml. fractions are taken. With 200 ml. of 92:8- to 91:9-mixtures of benzene and ethyl acetate and 200 ml. of 87:13 to 86:14-mixtures of the same solvent mixture by-products are eluted, whereas 600 ml. of 77:23 to 70:30 mixtures of benzene and ethyl acetate yield the desired 4-phenyl-azetidin-2-one which melts at 105–105.5 after recrystallizations from hexane.

EXAMPLE 12

A mixture of 1.162 g. of L-2,2-dimethyl-3-tertiary butyloxycarbonyl-5α-amino-thiazolidine-4-carboxylic acid methyl ester and 1.4 ml. ethyl-di-isopropyl-amine in 75 ml. of absolute toluene, is cooled with ice, gassed with nitrogen and treated with 5.76 ml. of diethyl aluminum chloride in toluene, added through a hypodermic needle. After standing for 32 hours at +7° C., the reaction mixture is diluted with chloroform and shaken during 10 minutes with a mixture of ice and a saturated sodium hydrogen carbonate solution and filtered through a filter aid, which is washed with chloroform. The organic solution is dried over sodium sulfate and evaporated; the residue is chromatographed on 115 g. of silica gel, the column being prepared with a 95:5-mixture of benzene and ethyl acetate and fractions of 100 ml. being taken. One of the isomers of 2,2-dimethyl-3-tertiary butyloxy-carbonyl-4-aminomethylene-thiazolidine-5-one, F. 105° C., is eluted with 200 ml. of 87.5:12.5- to 87:13-mixtures of benzene and ethyl acetate, a mixture of the two isomers of 2,2 - dimethyl-3-tertiary butyloxycarbonyl-4-amino-methylene-thiazolidine-5-one with 200 ml. of 86.5:13.5- to 86.14-mixtures of benzene and ethyl acetate, and the practically pure second isomer with 200 ml. of 85.5:14.5- to 85:15-mixtures of benzene and ethyl acetate; the last product already contains a small amount of the 3-tertiary butyloxycarbonyl - 4,4 - dimethyl-azetidino[3,2-d]thiazolidine-2-one and melts at 109–110° after recrystallization from hexane. The desired 3-tertiary butyloxycarbonyl - 4,4 - dimethyl - azetidino[3,2-d]thiazolidine - 2-one is eluted with 400 ml. of 84.5:15.5–83:17-mixtures of benzene and ethyl acetate and melts at 120°–121° C. after crystallization from hexane. The mother liquors and the product eluted with 200 ml. of 82.5:17.5- to 82:18-mixtures of benzene and ethyl acetate are combined and recrystallized from hexane to yield a further amount of the desired product. Unreacted starting material is isolated from the chromatogram by elution with further benzene-ethyl acetate mixtures.

EXAMPLE 13

A solution of 5.805 g. L-2,2-dimethyl-3-tertiary butyloxycarbonyl - 5α - amino-thiazolidine-4-carboxylic acid methyl ester in 400 ml. of absolute toluene and 7.5 ml. of ethyl-di-isopropylamine is cooled after gassing with nitrogen and stirred thoroughly at —15°. A total of about 20 ml. of an approximately 1.75 molar solution of dimethyl aluminum chloride in toluene is added dropwise over a period of 45 minutes; the solution turns yellow and the temperature uses to —10° C. After stirring for 45 minutes at —10° C. to —15° C. an additional 15 ml., and after 60 minutes a further 3–4 ml. of the reagent are added and the reaction mixture is stirred for 30 minutes and then poured at —50 C. into 200 ml. of toluene, 400 ml. of ice and 50 ml. of a saturated sodium hydrogen carbonate solution. After thoroughly stirring for 10 minutes, the reaction mixture is filtered through a filter aid which is washed with several portions of methylene chloride. The aqueous phase is extracted with 3 portions of methylene chloride and the combined organic solutions are dried over sodium sulfate and evaporated; the residue is chromatographed on 370 g. of silica gel, the column being prepared in a 90:10-mixture of benzene and ethyl acetate. With 87.5:12.5-, 85:15-, 82.5:17.5- and 80:20-mixtures of benzene and ethyl acetate (500 ml. of each), the 2,2 - dimethyl-3-tertiary butyloxycarbonyl-4-aminomethylene-thiazolidine-5-one are eluted, a mixture of the isomers being washed out with 200 ml. of a 79:21-mixture of benzene and ethyl acetate. With 300 ml. of a 79:21-mixture, 500 ml. of a 78:22-mixture, 500 ml. of a 77:23-mixture and 300 ml. of a 76:24-mixture of benzene and ethyl acetate the 3-tertiary butyloxycarbonyl-4,4-dimethyl-azetidino[3,2-d]thiazolidine-2-one is eluted, which crystallizes spontaneously and is recrystallized from hexane. The mother liquors are rechromatographed and yield a further amount of the desired product. With 200 ml. of a 76:24-mixture, 500 ml. of a 65:35-mixture and 500 ml. of a 50:50-mixture of benzene and ethyl acetate unreacted starting material is eluted from the first chromatogram; the L-2,2-dimethyl-3-tertiary butyloxycarbonyl - 5α-amino-thiazolidine-4-carboxylic acid methyl ester crystallizes spontaneously and melts at 55–58°.

EXAMPLE 14

A solution of 0.587 g. of L-2,2-dimethyl-3-tertiary butyloxycarbonyl-5α-amino-thiazolidine-4-carboxylic acid methyl ester in 40 ml. of absolute dioxan is stirred while being heated to 80° C. in an atmosphere of nitrogen, and 3 ml. of a 1.6-molar solution of triethyl-aluminum in absolute toluene are added rapidly. The batch is stirred for 15 minutes at 80° C., further stirred under an atmosphere of nitrogen, then treated with 5 ml. of tertiary butanol before it is poured into a mixture of 20 ml. of 20% aqueous citric acid and 100 g. of ice. It is then extracted with 2×150 ml. of methylene chloride. The organic extract is washed with 50 ml. of water, dried and evaporated. In the infrared absorption spectrum (in methylene chloride), the remaining clear oil shows bands at 2.85μ, 5.60μ, and 9.35μ, which are characteristic of 3-tertiary butyl-carbonyl - 4,4 - dimethyl-azetidino[3,2-d] thiazolidine-2-one, and also the bands at 2.75μ, 6.0μ, 6.15μ and 9.25μ that are typical of the two isomeric 2,2-dimethyl-3-tertiary butyloxycarbonyl-4-aminomethylene-thiazolidine-5-ones. Quantitative analysis of the nucelar resonance spectrum indicates the following composition of the product: 10% L-2,2-dimethyl-3-tertiary butyloxycarbonyl-5α-amino-thiazolidine-4-carboxylic acid methyl ester, 60% 3-tertiary butyloxycarbonyl - 4,4-dimethyl-azetidino[3,2-d]thiazolidin-2-one, and 30% of the isomeric 2,2-dimethyl - 3-tertiary butyloxycarbonyl-4-aminomethylene-thiazolidin-5-ones; the mixture can be separated, for example, as described in Example 1.

EXAMPLE 15

A solution of 0.587 g. of L-2,2-dimethyl-3-tertiary butyloxycarbonyl-5α-amino-thiazolidine - 4 - carboxylic acid methyl ester in 40 ml. of toluene is heated to 80° C. and flushed with nitrogen while being stirred. After one hour, 0.093 g. of aniline is added, and shortly afterwards 4.8 mmol of triethylaluminium in toluene. The batch is stirred for 15 minutes at 80° C., then treated with 5 ml. of tertiary butanol, and the reaction mixture worked up as described in Example 14. An oily product is obtained which, in the infrared absorption spectrum (in methylene chloride) shows bands at 2.85μ, 5.60μ and 9.35μ, typical of 3-tertiary butyloxycarbonyl-4,4 - dimethylazetidino[3,2-d] thiazolidine-2-one, and also the bands at 2.75μ, 6.0μ, 6.15μ, and 9.25μ of the two isomeric 2,2-dimethyl-3-tertiary butyloxycarbonyl-4-aminomethylene-thiazolidine - 5 - ones. Quantitative analysis of the nuclear resonance spectrum indicates the following composition: 10% of L-2,2-dimethyl-3-tertiary butyloxycarbonyl-5α-amino-thiazolidine-4-carboxylic acid methyl ester, 75% of 3-tertiary butyloxycarbonyl-4,4 - dimethyl-azetidino[3,2-d]thiazolidin-2-one, and 15% of the isomeric 2,2-dimethyl-3-tertiary butyloxycarbonyl-4-amino-methylene-thiazolidin-5-ones; the mixture can be worked up, for example, as described in Example 1.

What is claimed is:

1. A compound of the formula

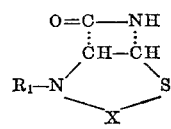

wherein $R_1$ represents a member selected from the group consisting of a hydrogen atom and the acyl residue of a semi-ester of carbonic acid, and X is a moiety of the formula

in which each of $R_2$ and $R_3$ is lower alkyl.

2. A compound as claimed in claim 1 and being a compound of the formula

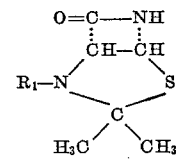

wherein $R_1$ is a member selected from the group consisting of a hydrogen atom and the acyl residue of a semiester of carbonic acid.

3. A compound as claimed in claim 1 and being the 3-tertiary butyloxycarbonyl-4,4-dimethyl-azetidino[3,2-d] thiazolidin-2-one.

4. A compound as claimed in claim 1 and being the 4,4-dimethyl-azetidino[3,2-d]thiazolidin-2-one.

5. Process for the manufacture of 4,4-di-lower alkyl substituted 3-Y-2-oxo-azetidino[3,2-d]thiazolidine compounds, in which Y is the acyl residue of a semi-ester of carbonic acid, wherein a 2,2-di-lower alkyl substituted 3-Y-5α-amino-thiazolidine-4-carboxylic acid ester, Y being defined as above, is treated with an organic aluminium compound.

6. Process as claimed in claim 5 wherein an ester used as starting material is a member selected from the group consisting of a lower alkyl ester, a halogenated lower alkyl ester and a phenyl-lower alkyl ester, which is treated with an organic aluminium compound.

7. Process as claimed in claim 6, wherein a member selected from the group consisting of a tri-lower alkyl aluminium, a di-lower alkyl aluminium-hydride, a di-lower alkyl aluminium halide, a tri-cycloalkyl-aluminium, a di-cycloalkyl aluminium hydride, a di-cycloalkyl aluminium halide, and a tri-lower alkoxy aluminium is used as the organic aluminium compound.

References Cited

UNITED STATES PATENTS 3,119,813    1/1964    Taub.

OTHER REFERENCES

Woodward, Science, vol. 153, No. 3735, July 29, 1966, pp. 487–93.

ALEX MAZEL, Primary Examiner

R. J. GALLAGHER, Assistant Examiner

PO-1050
(5/69)

UNITED STATES PATENT OFFICE
CERTIFICATE OF CORRECTION

Patent No. 3,483,215      Dated December 9, 1969

Inventor(s) ROBERT BURNS WOODWARD

It is certified that error appears in the above-identified patent and that said Letters Patent are hereby corrected as shown below:

Column 2, line 30, amend the bottom half of the formula to read:

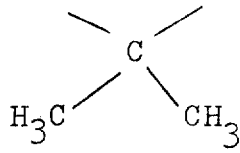

Column 5, line 30, amend the bottom half of the formula to read:

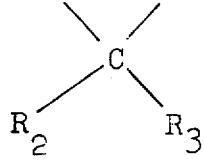

line 33, "hadicals" should read --- radicals ---.

Column 6, line 6, "573,886" should read --- 573,866 ---;
line 23, "esterified" should read --- etherified ---.

Column 7, line 69, "methyle" should read --- methyl ---.

Column 10, line 45, "105.5" should read --- 105.5° ---.

Column 11, line 26, "-50C" should read --- -5°C ---;
line 72, "carbonyl" should read --- oxycarbonyl ---.

Column 12, line 1, "nucelar" should read --- nuclear ---.

SIGNED AND
SEALED
JAN 26 1971

Edward M. Fletcher, Jr.
Attesting Officer

WILLIAM E. SCHUYLER, JR.
Commissioner of Patents